Figure 1:
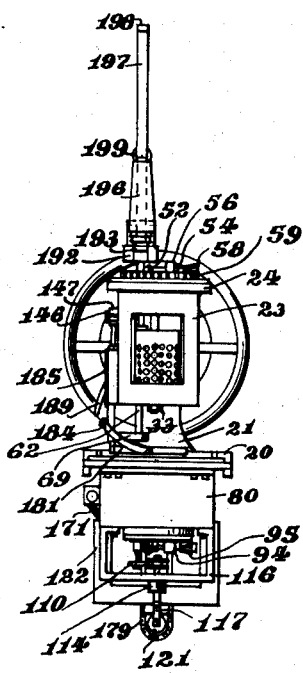

Oct. 27, 1953  J. MONTGOMERY  2,656,803
TUFTING MACHINE FOR PRODUCING ORNAMENTAL DESIGNS
Filed Sept. 19, 1952  10 Sheets-Sheet 1

INVENTOR.
Julius Montgomery, Deceased
Delray Montgomery, Administratrix
BY

ATTORNEY

Oct. 27, 1953  J. MONTGOMERY  2,656,803
TUFTING MACHINE FOR PRODUCING ORNAMENTAL DESIGNS
Filed Sept. 19, 1952                                10 Sheets-Sheet 2

Oct. 27, 1953            J. MONTGOMERY            2,656,803
TUFTING MACHINE FOR PRODUCING ORNAMENTAL DESIGNS
Filed Sept. 19, 1952            10 Sheets-Sheet 3

INVENTOR.
Julius Montgomery, Deceased
Dellray Montgomery
Administratrix
BY B.P. Fishburne
ATTORNEY Oct. 27, 1953  J. MONTGOMERY  2,656,803
TUFTING MACHINE FOR PRODUCING ORNAMENTAL DESIGNS
Filed Sept. 19, 1952  10 Sheets-Sheet 4

INVENTOR.
Julius Montgomery, Deceased
Dellray Montgomery,
Administratrix
BY
ATTORNEY

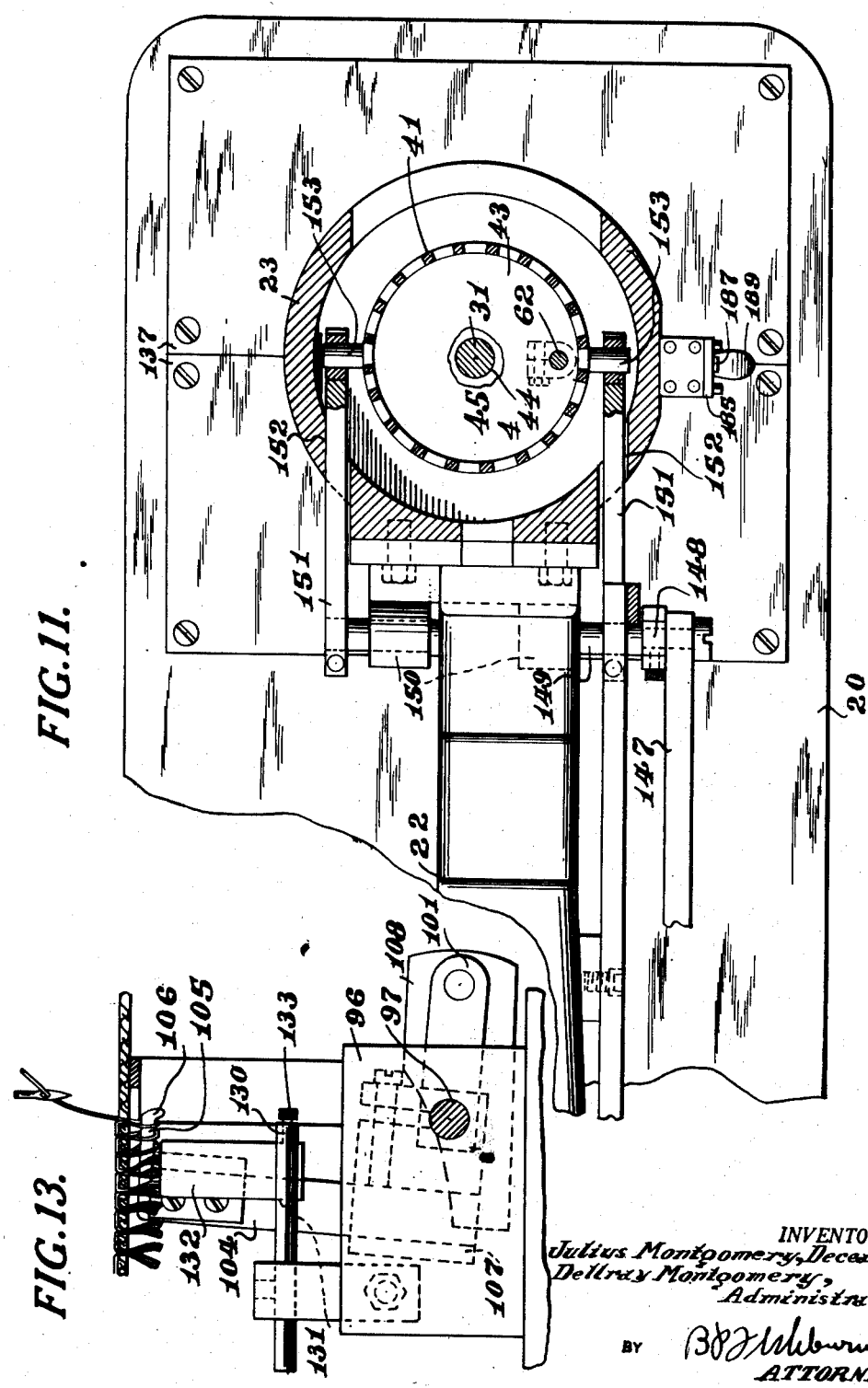

Oct. 27, 1953     J. MONTGOMERY     2,656,803
TUFTING MACHINE FOR PRODUCING ORNAMENTAL DESIGNS
Filed Sept. 19, 1952     10 Sheets—Sheet 6

INVENTOR
Julius Montgomery, Deceased
Dellray Montgomery, Administratrix

BY

ATTORNEY

Oct. 27, 1953  J. MONTGOMERY  2,656,803
TUFTING MACHINE FOR PRODUCING ORNAMENTAL DESIGNS
Filed Sept. 19, 1952  10 Sheets-Sheet 7
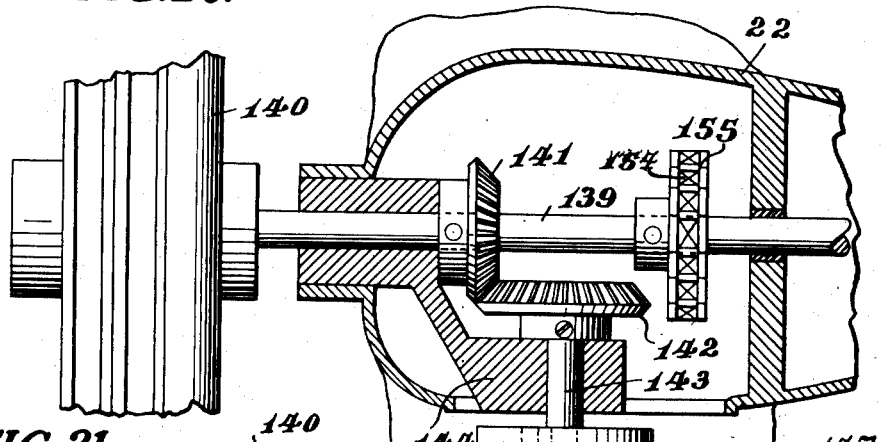
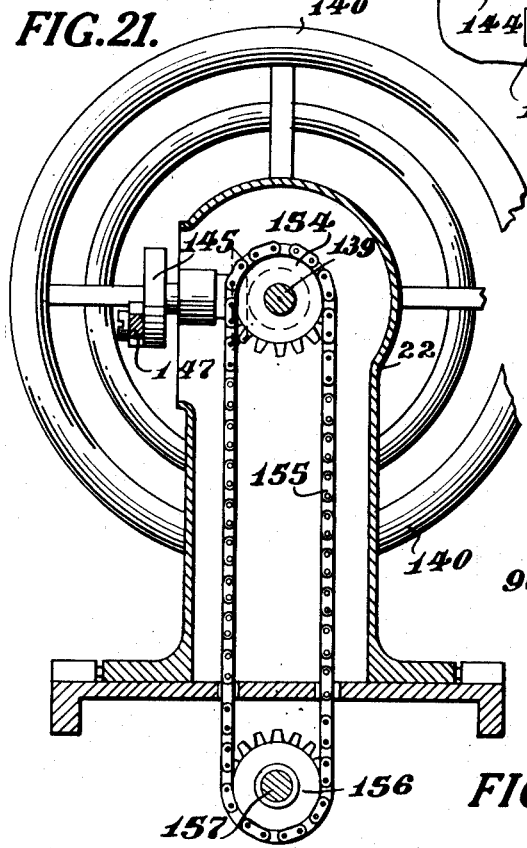
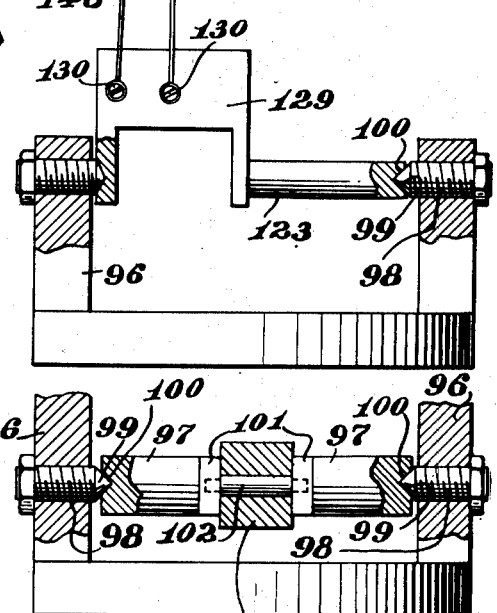
INVENTOR
Julius Montgomery, Deceased
Dellray Montgomery, Administratrix
BY
ATTORNEY

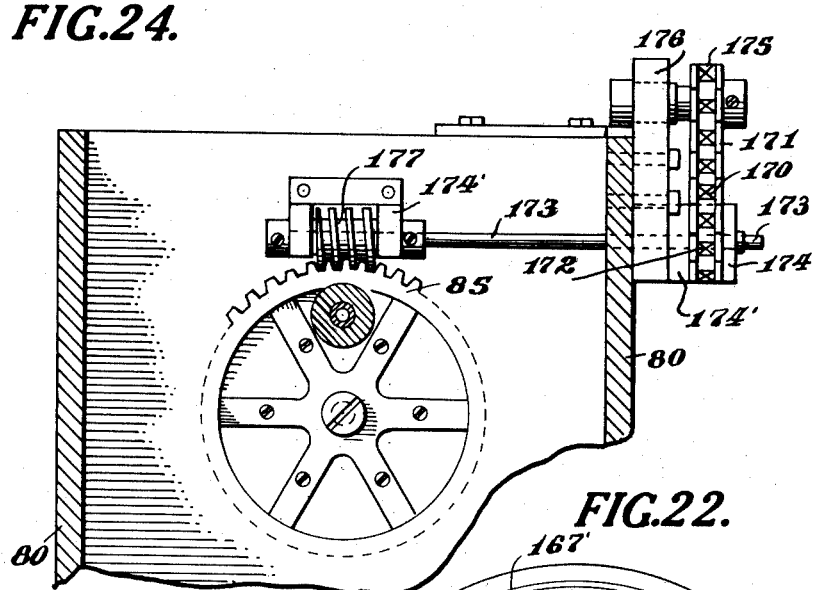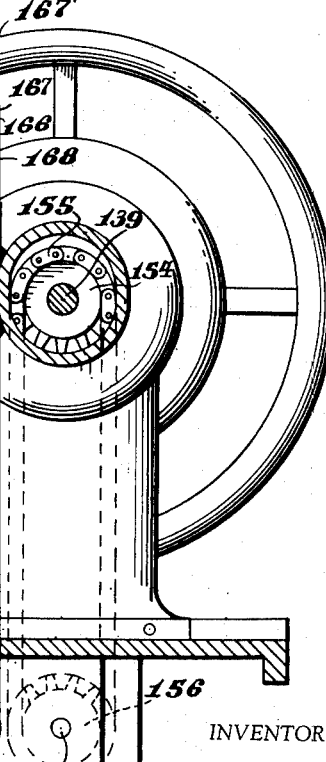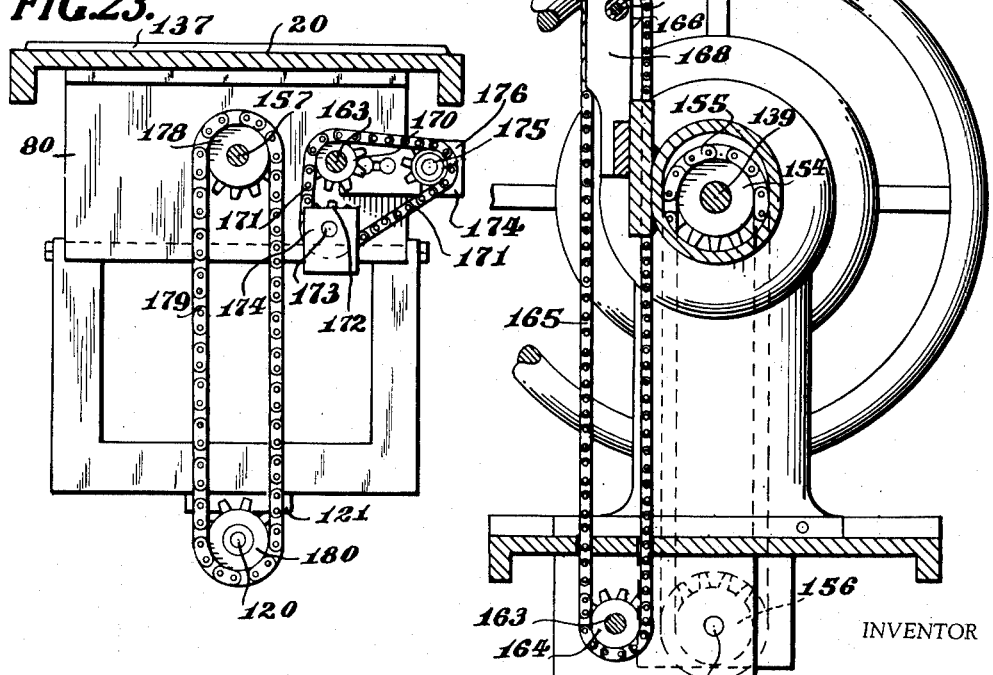

Oct. 27, 1953  J. MONTGOMERY  2,656,803
TUFTING MACHINE FOR PRODUCING ORNAMENTAL DESIGNS
Filed Sept. 19, 1952  10 Sheets-Sheet 9

INVENTOR
Julius Montgomery, Deceased
Delray Montgomery,
Administratrix.
BY
ATTORNEY Oct. 27, 1953 J. MONTGOMERY 2,656,803
TUFTING MACHINE FOR PRODUCING ORNAMENTAL DESIGNS
Filed Sept. 19, 1952 10 Sheets-Sheet 10
FIG.29.
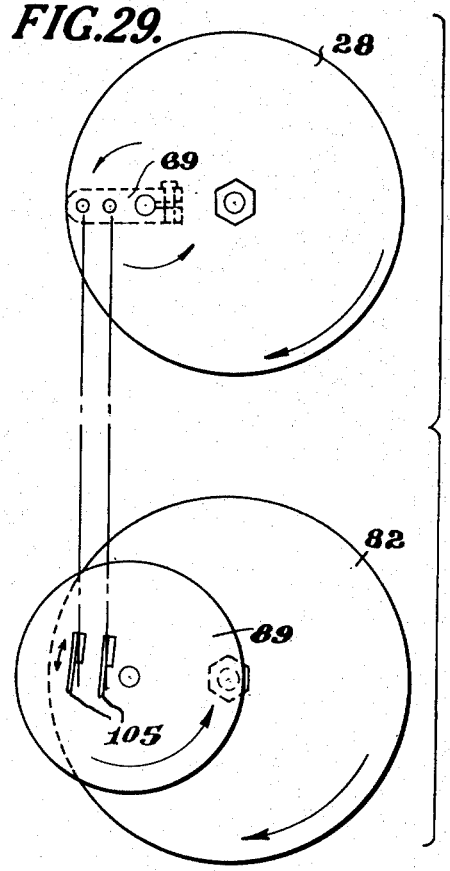
FIG.32.
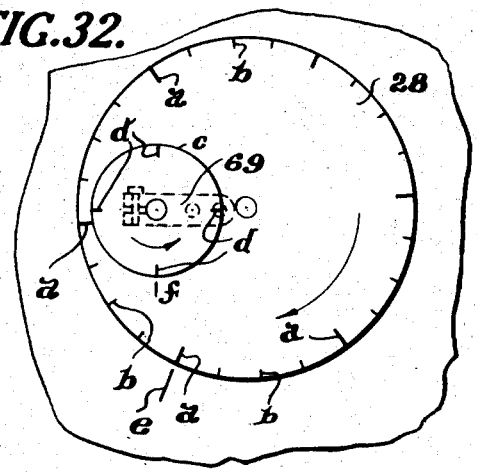
FIG.34.
FIG.33.
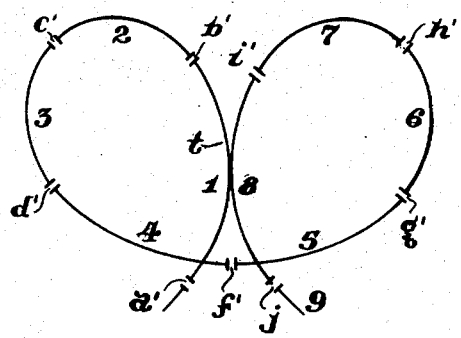
FIG.30.
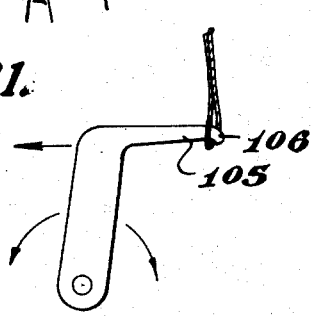
FIG.31.
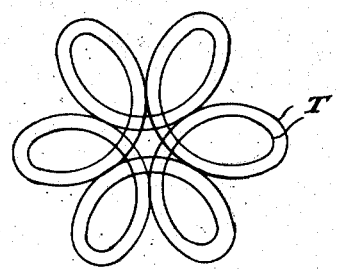
INVENTOR.
Julius Montgomery, Deceased
Deltray Montgomery, Administratrix
BY
ATTORNEY Patented Oct. 27, 1953

2,656,803

UNITED STATES PATENT OFFICE 2,656,803

TUFTING MACHINE FOR PRODUCING ORNAMENTAL DESIGNS

Julius Montgomery, deceased, late of Dalton, Ga., by Dellray Montgomery, administratrix, Dalton, Ga., assignor to Lawtex Corporation, Dalton, Ga., a corporation of Georgia Application September 19, 1952, Serial No. 310,522

18 Claims. (Cl. 112—79)

The present invention relates to tufting machines for forming severed or unsevered loops and has particular reference to such machines for producing ornamental designs.

An important object of the invention is to provide a tufting machine which will automatically operate to produce an ornamental design upon the fabric base while the fabric base is held stationary.

A further object of the invention is to provide means to cause the needle and coacting looper to move in unison in identical paths of travel.

A further object of the invention is to provide means to cause the needle and looper to travel bodily in an orbit while turning upon their individual axes as a planet.

A further object of the invention is to provide a machine of the above-mentioned character which is reliable in operation and is adjustable within limits to vary the produced design.

Other objects and advantages of the invention will be apparent during the course of the following description.

Figure 2:
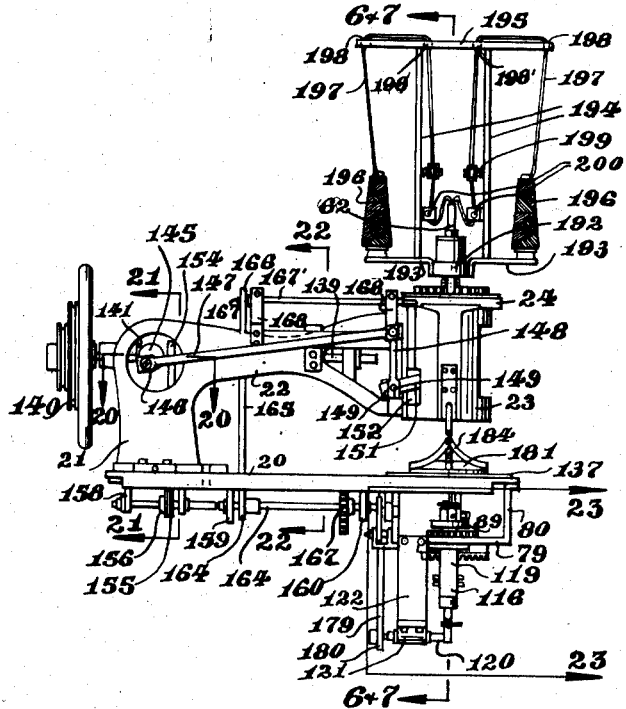
Figure 3:
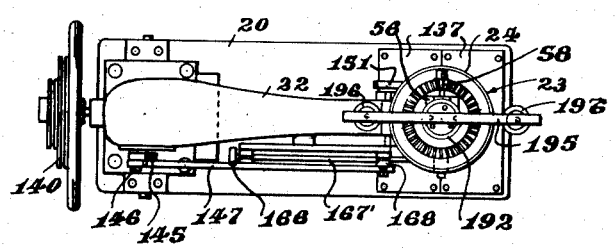
Figure 4:
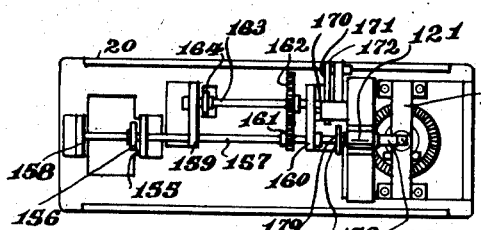
Figure 5:
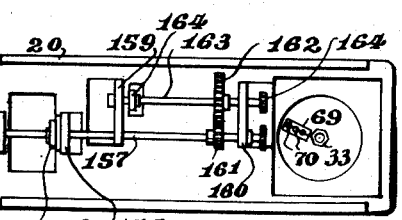
Figure 6:
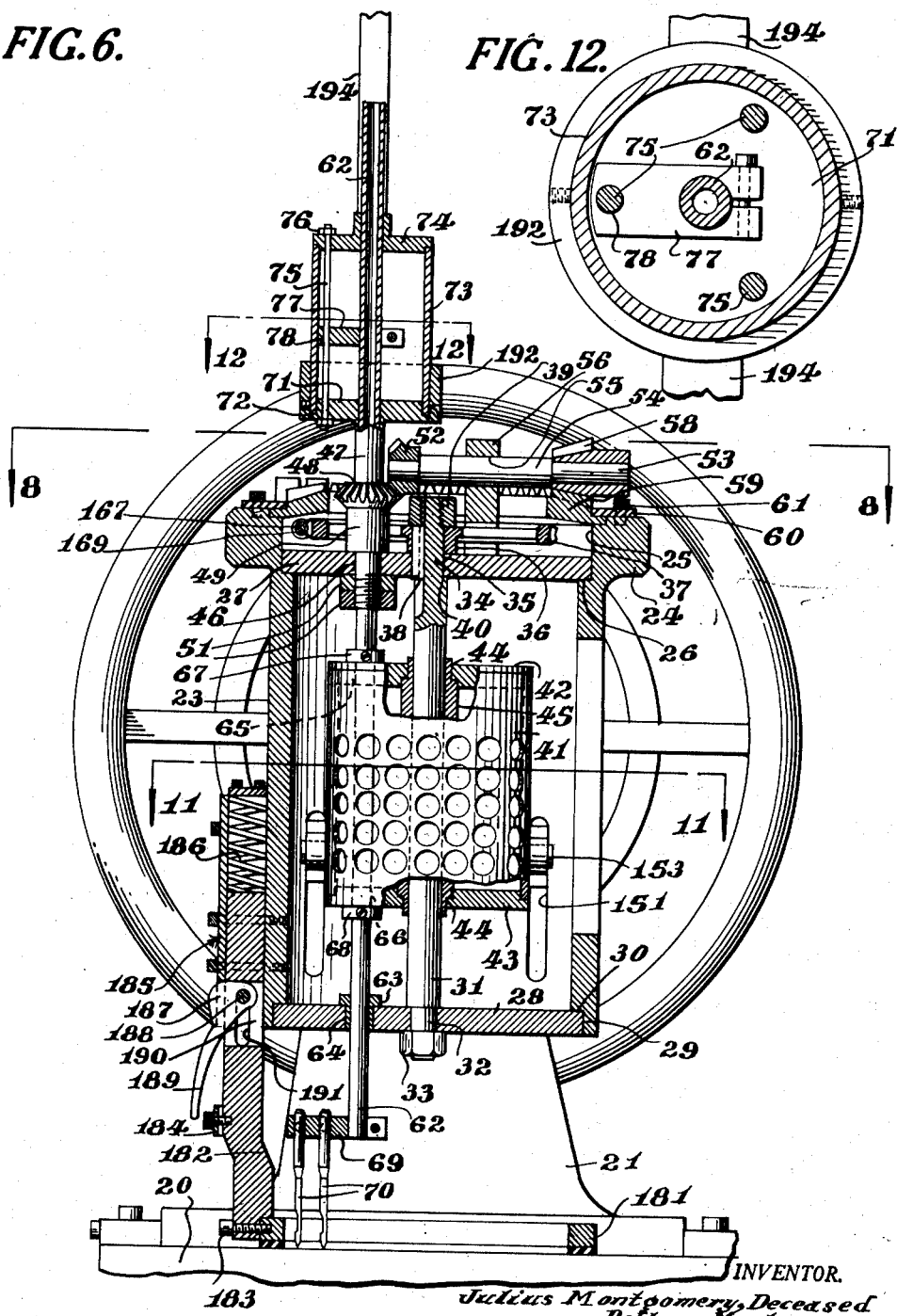
Figure 7:
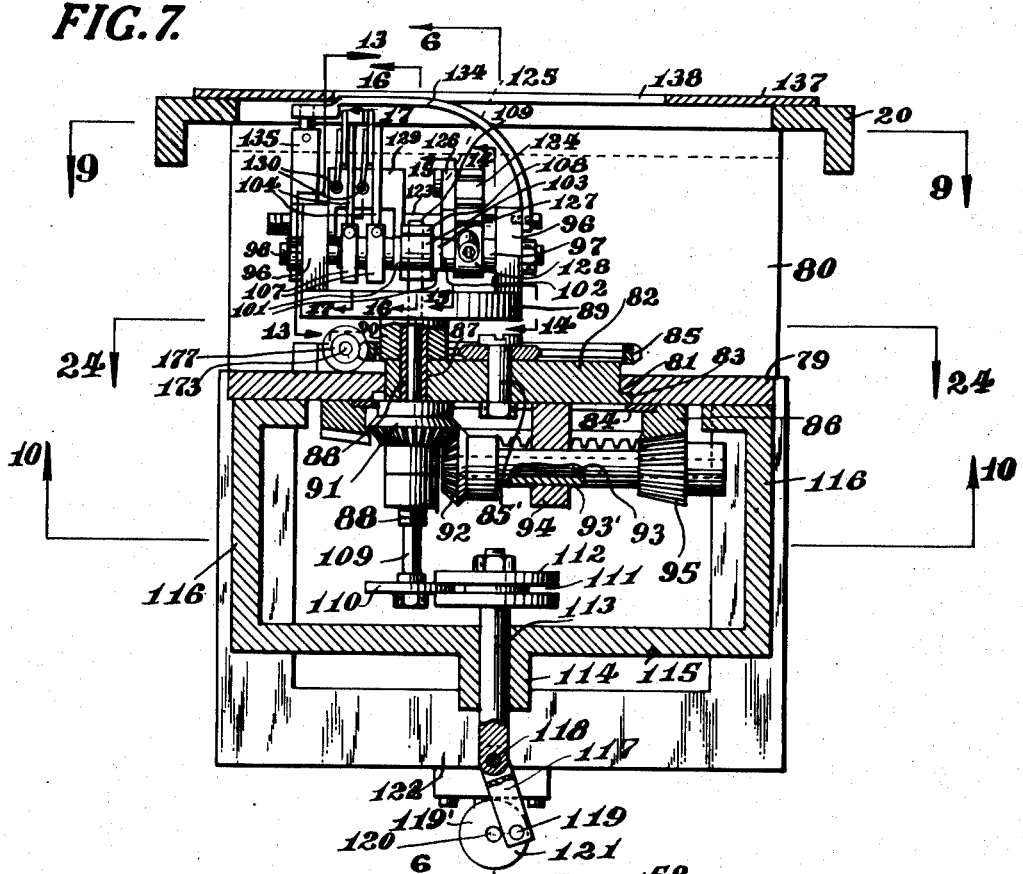
Figure 8:
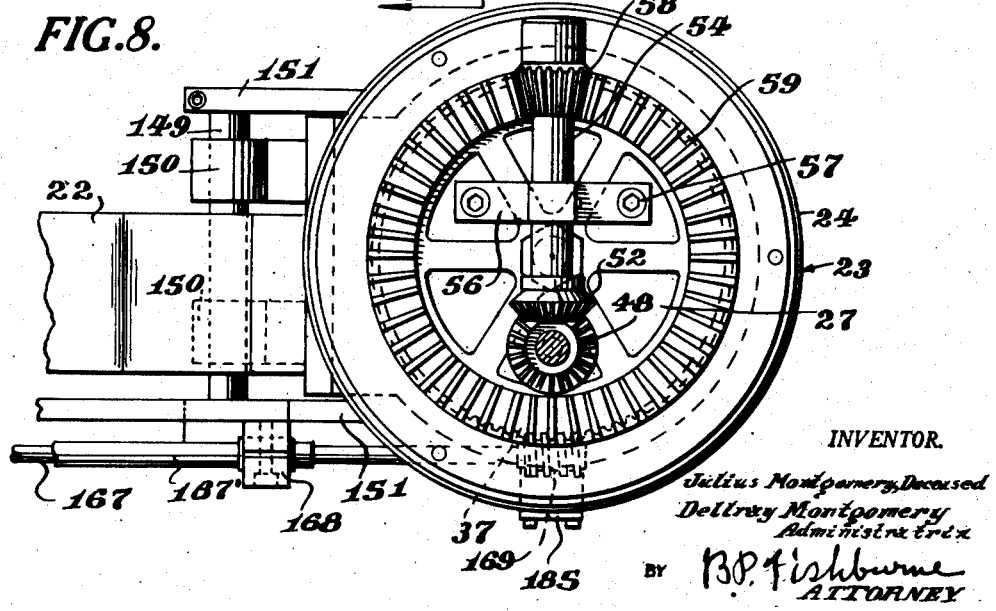
Figure 9:
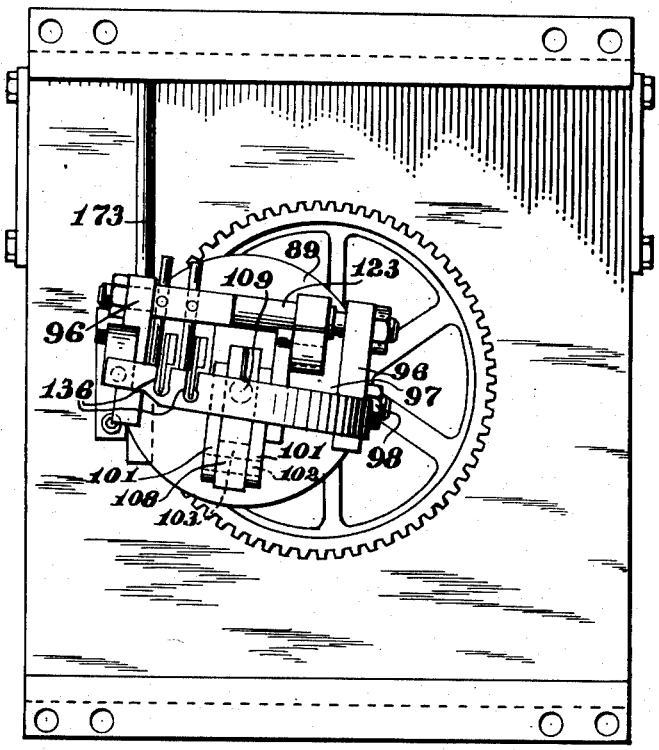
Figure 10:
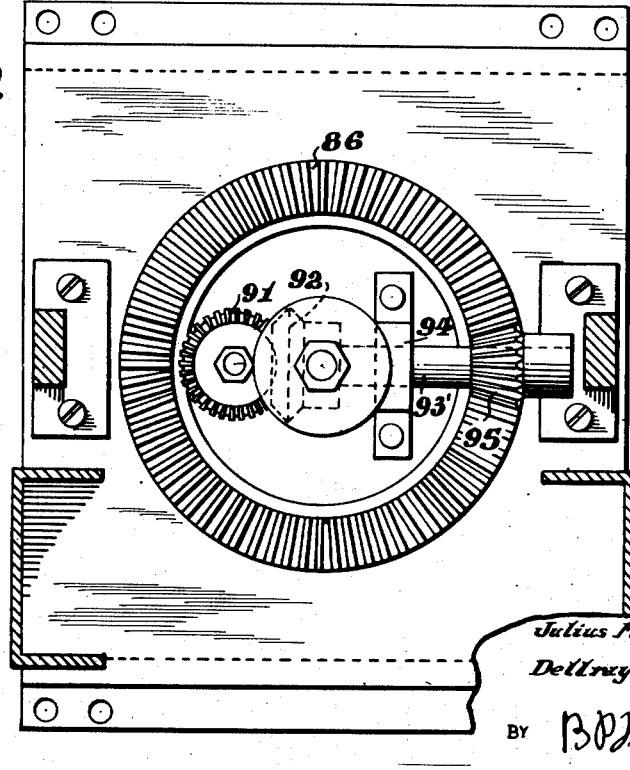
Figure 14:
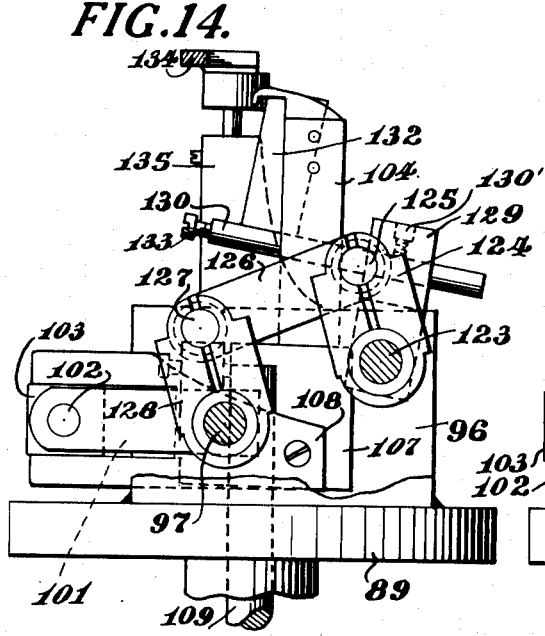
Figure 15:
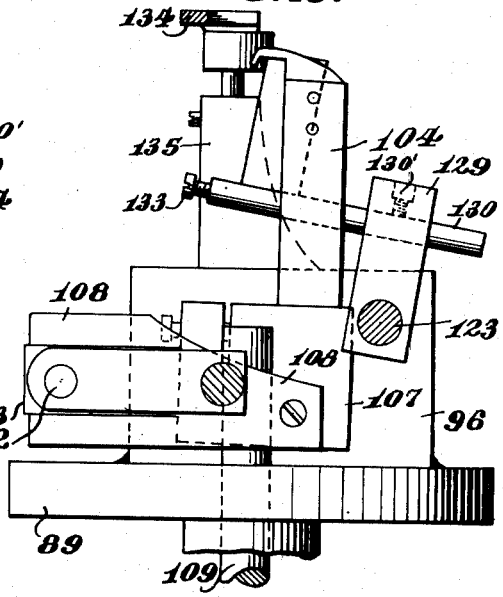
Figure 16:
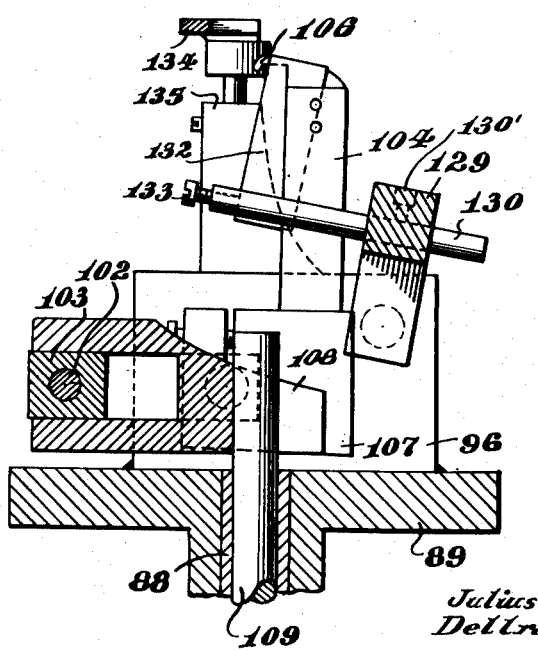
Figure 17:
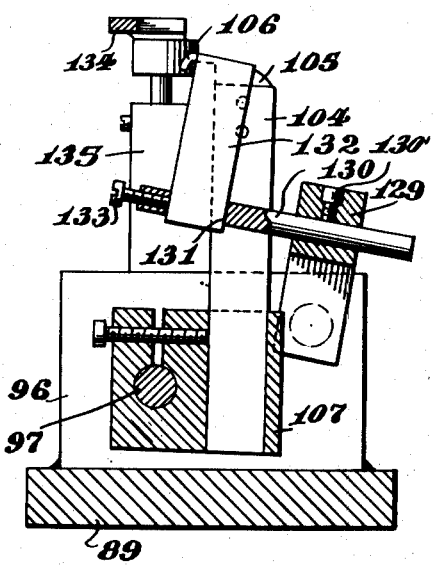
Figure 27:
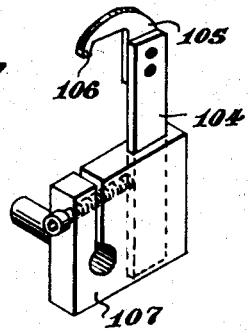
Figure 25:
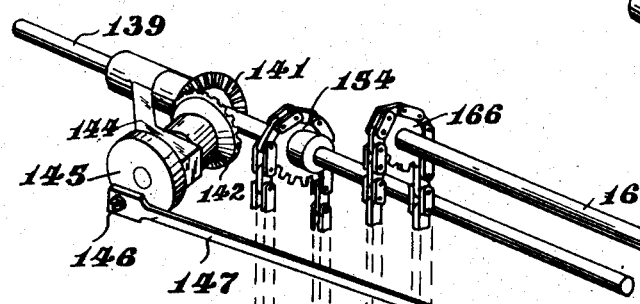
Figure 28:
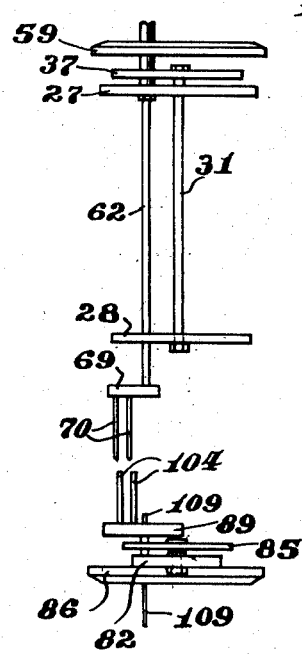
Figure 26:
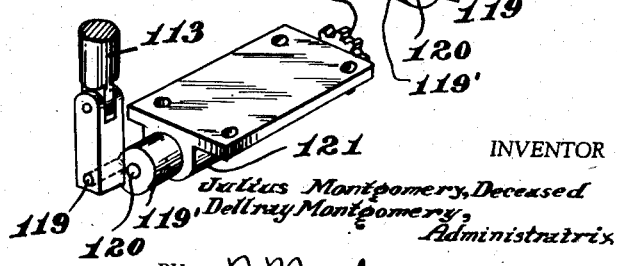

In the accompanying drawings forming a part of this application and in which like numerals are employed to designate like parts throughout same, Figure 1 is an end elevation of a tufting machine embodying the invention, Figure 2 is a side elevation of the same, Figure 3 is a plan view of the machine, Figure 4 is a bottom plan view of the same, Figure 5 is a similar view, parts removed, Figure 6 is a transverse vertical section through the machine, taken on line 6—6 of Figure 2, the parts beneath the base of the machine being omitted, Figure 7 is a similar view on line 6—6 of Figure 2 showing the parts beneath the base of the machine, Figure 8 is a horizontal section taken on line 8—8 of Figure 6, parts broken away, Figure 9 is a plan view of the looper planet and associated elements, viewed from the horizontal line 9—9 of Figure 7, Figure 10 is a horizontal section taken on line 10—10 of Figure 7, looking in the direction of the arrows, Figure 11 is a horizontal section taken on line 11—11 of Figure 6, Figure 12 is a horizontal section taken on line 12—12 of Figure 6, Figure 13 is a transverse vertical section taken on line 13—13 of Figure 7, Figure 14 is a transverse vertical section taken on line 14—14 of Figure 7, Figure 15 is a similar view taken on line 15—15 of Figure 7, Figure 16 is a similar view taken on line 16—16 of Figure 7, Figure 17 is a similar view taken on line 17—17 of Figure 7, Figure 18 is a side elevation of the looper carrying crank shaft, parts in section, Figure 19 is a side elevation of the blade carrying crank shaft, parts in section, Figure 20 is a horizontal section taken on line 20—20 of Figure 2, parts in elevation and parts broken away, Figure 21 is a transverse vertical section taken on line 21—21 of Figure 2, Figure 22 is a transverse vertical section taken on line 22—22 of Figure 2, Figure 23 is a transverse vertical section taken on line 23—23 of Figure 2, Figure 24 is a horizontal vertical section taken on line 24—24 of Figure 7, Figure 25 is a perspective view of the main drive shaft and associated elements, Figure 26 is a perspective view of an operating eccentric element and associated parts, Figure 27 is a perspective view of a looper and associated elements, Figure 28 is a partly diagrammatic view showing the relation of the planetary carriers, planets and associated elements, Figure 29 is a diagrammatic view plan view of the planetary carriers, planets and associated elements, Figure 30 is a partly diagrammatic view of the looper and blade, showing the formation of severed loops, Figure 31 is a similar view of a looper showing the formation of an unsevered loop, Figure 32 is a diagrammatic view explaining the movement of the carrier and planet in forming the design, Figure 33 is a diagrammatic view showing the formation of the design, Figure 34 is a plan view of the design.

In the drawings, the numeral 20 designates a horizontal bed or base upon which a vertical stock 21 is rigidly mounted, carrying a horizontal arm 22. Rigidly secured to the forward end of the arm 22 is a hollow cylindrical head 23, Figures 1, 2 and 6. At its top, Figure 6, the cylindrical head has an annular flange 24 forming a cylindrical recess 25 and horizontal shoulder 26. A horizontal rotatable cylindrical planetary carrier 27 is mounted within the recess 25 and engages the shoulder 26. A lower cylindrical planetary carrier 28 is rotatably mounted within a cylindrical recess 29 formed in the lower end of the head 23 and engages a shoulder 30. A vertical shaft 31 is disposed at the centers of the carriers 27 and 28 and has a reduced extension 32 at its lower end and this reduced extension extends through an opening in the carrier 28 and carries a nut 33 which serves to rigidly clamp the vertical shaft to the carrier 28. The vertical shaft 31 is provided at its upper end with a reduced extension 34, passing through a central opening 35 in the carrier 27 and through an opening in a hub 36 of a horizontal worm wheel 37. The carrier 27 and hub 36 are locked to the reduced extension 34 to rotate therewith by means of a key 38, while the upper end of the reduced extension is threaded to receive a nut 39. The reduced extension forms a shoulder 40 and the nut 39 clamps the carrier 27 against this shoulder 40. It is thus seen that the upper and lower carriers 27 and 28 rotate together and cannot move vertically with respect to the cylindrical head 23.

A coupling sleeve or element 41 is arranged within the head and has upper and lower heads 42 and 43 rotatably mounted in its ends. These heads have openings 44 formed therein to receive an inner guide sleeve 45, rigidly secured within these openings. This guide sleeve is slidably mounted upon the shaft 31 to reciprocate and turn thereon for reciprocating the needle bar.

The carrier 27 has a vertical opening 46 formed therein rotatably receiving the lower end of a vertical sleeve 47 held against longitudinal movement with relation to the carrier. The opening 46 is disposed radially outwardly of the opening 35 and spaced therefrom for a substantial distance and is therefore eccentric with the opening 35. The sleeve 47 has a bevel-gear 48 rigidly secured thereto and this bevel-gear has a hub 49 engaging the carrier 27. The lower end of the sleeve 47 is screw-threaded for receiving nuts 51 which prevent the upward displacement of the sleeve 47 but leaving the sleeve free to turn with respect to the carrier 27. The hub 49 extends downwardly between the spokes of the worm wheel 37.

The bevel-gear 48 is engaged by a bevel-gear 52, which drives the same and this bevel-gear is rigidly secured to a horizontal shaft 53 extending radially of the carrier 27. The shaft 53 is rotatable within a sleeve bearing 54 clamped within the opening 55 of a bracket 56, which has its lower end forked and extending between the spokes of the worm wheel 37 and rigidly secured to the carrier 27 by bolts 57 or the like, Figure 8. Rigidly secured to the outer end of the shaft 53 is a bevel-gear 58, engaging a stationary annular sun-gear 59 which is clamped to the flange 24 by a ring 60 and held in place by bolts 61 tapped into the flange 24. It is thus seen that when the worm wheel 37 is rotated that it will turn the planetary carrier 27 and all elements carried thereby and the rotation of the planetary carrier will cause the bevel-gear 58 to travel around the stationary sun-gear 59 and the bevel-gear 58 will turn upon its axis and rotate the shaft 53 upon its axis. This rotation of the shaft 53 will rotate the bevel-gear 52 which will rotate bevel-gear 48 upon its axis and the sleeve 47 will be turned upon its axis while it is moving bodily with the planetary carrier 27.

Slidably mounted within the sleeve 47 is a tubular needle bar 62, which is to be vertically reciprocated and turned upon its longitudinal axis. This tubular needle bar extends downwardly below the lower end of the sleeve 47 and below the lower planetary carrier 28. The tubular needle bar 62 is slidably mounted within a guide sleeve 63 held within an opening 64 in the planetary carrier 28. This guide sleeve 63 is in vertical alignment with the sleeve 47 and is radially spaced outwardly from the shaft 31, as shown. The tubular needle bar 62 extends through openings 65 and 66 formed in the heads 42 and 43 and is rotatable within these openings. Rings 67 and 68 are clamped to the tubular needle bar and slidably engage the heads 42 and 43. It is thus seen that the needle bar may turn bodily and upon its axis with respect to the sleeve 41 but will reciprocate therewith.

Rigidly secured to the lower end of the tubular needle bar 62 is a horizontal needle planet or bar 69, extending for a substantial distance radially beyond the tubular needle bar. The planet or bar 69 has vertical openings for receiving the upper ends of vertical needles 70 which are clamped to the planet 69 by any suitable means. These needles 70 are radially spaced from each other and from the tubular needle bar 62. It is thus apparent that when the tubular needle bar 62 is rotated upon its axis that the radial planet or bar 69 will cause the needles 70 to travel in spaced concentric paths if this action were not modified by the movement of the planetary carriers 27 and 28, as will be more fully explained.

Preferably formed integral with the upper end of the sleeve 47 is a lower head 71 having a shoulder 72. A coupling sleeve 73 is mounted upon the head 71 and an upper head 74 has a reduced lower end to fit within the coupling sleeve 73. The heads 74 and 71 are clamped to the coupling sleeve 73 by rods or draw-bolts 75 having nuts 76, so that the sleeve 73 rotates with the head 71. The coupling sleeve 73 and heads 71 and 74 therefore turn as a unit with the sleeve 47. A crank 77 is horizontally arranged within the coupling sleeve 73 and extends radially beyond the tubular needle bar 62 and is clamped to the tubular needle bar. This crank has a vertical opening 78, Figures 6 and 12, which slidably receives one rod 75. Since the crank is slidable upon the rod 75, it does not interfere with the reciprocation of the tubular needle bar but this crank will cause the tubular needle bar to rotate upon its axis with the sleeve 47.

Arranged beneath the base 20 is a horizontal bed 79 carried by vertical uprights 80, which are rigidly secured to the lower face of the base 20, Figures 1, 2 and 7. The bed 79 has a cylindrical opening 81 formed therein receiving a horizontal rotatable planetary carrier 82 held against upward movement by a flange 83 and against downward movement by a ring 84 rigidly secured to the bed 79. The planetary carrier 82 has its center in alignment with the centers of the planetary carriers 27 and 28. Rigidly mounted upon the upper face of the planetary carrier 82 by a center bolt 85' is a worm wheel 85 which is of the same diameter as the worm wheel 37 and is rotated in the same direction and at the same speed with the worm wheel 37. A stationary annular sun gear 86 is rigidly mounted upon the lower face of the bed 79 in concentric relation to the planetary carrier 82. The planetary carrier 82 has a vertical opening 87 formed therein radially outwardly of the center of the planetary carrier and this opening receives a vertical rotatable sleeve 88, projecting above and below the carrier 82. A horizontal rotatable looper planet 89 has a depending hub 90 integral therewith and this hub is rigidly mounted upon the upper end of the sleeve 88. Arranged beneath the planetary carrier 82 is a bevel-gear 91, rigidly secured to the sleeve 88. It is thus seen that the sleeve is rotatable with respect to the planetary carrier 82 but is held between hub 90 and the bevel-gear 91 against longitudinal movement. The bevel-gear 91 engages a bevel-gear 92, rigidly mounted upon a horizontal shaft 93, journaled in a sleeve 93' rigidly clamped in an opening formed in a bracket 94, rigidly secured to the planetary carrier 82. The shaft 93 is held against longitudinal movement and has an outer bevel-gear 95 rigidly secured thereto engaging sun-gear 86. It is thus seen that when the planetary carrier 82 is rotated, the bevel-gear 95 will travel about the sun-gear 86 and the shaft 93 will be turned upon its longitudinal axis in addition to its bodily travel with the planetary carrier 82 and the bevel-gear 92 will rotate the bevel-gear 91 which will in turn rotate the rotatable sleeve 88 which will rotate the looper planet 89 upon its vertical axis.

The looper planet 89 carries the loopers. Rigidly mounted upon the looper planet 89 are vertical blocks 96, Figures 7, 14 to 17. A horizontal crank shaft 97 is provided, and is arranged between the blocks 96 and is pivotally supported by bolts 98, Figure 18, tapped into the blocks 96 and having tapered ends 99 fitting within tapered recesses 100. The crank shaft 97 is horizontal and is pivoted for rocking movement and is provided with generally horizontal cranks 101, Figure 9, rigidly connected by a pin 102 pivotally receiving a block 103. The numeral 104 designates generally vertical loopers, Figures 7, 14 to 17, having bills 105 with a downturned end 106. These loopers are rigidly mounted upon blocks 107 which are clamped to the left end of the crank shaft 97, Figure 7.

The crank shaft 97 is rocked by means of a head 108, having a forked end which receives the block 103. The head 108 is rigidly mounted upon a vertical shaft 109, Figures 7, 13 to 17, which is slidably mounted within the sleeve 88. The shaft 109 has a horizontal disc 110, Figure 7, rigidly secured to its lower end and this disc extends into an annular groove 111 formed upon a disc 112. This disc 112 is rigidly mounted upon the upper end of a vertical reciprocatory shaft 113, slidably mounted in a bearing 114 formed upon a bracket 115 having vertical arms 116 which are rigidly secured to the lower face of the bed 79, Figures 2 and 7. A link 117 is pivotally connected with the reciprocatory shaft 113 at 118 and this link is pivotally connected with a pin 119 which is carried by a disc 119' secured to a horizontal shaft 120 and is eccentric to the longitudinal axis of the shaft 120, Figures 25 and 26. The shaft 120 is journaled in a stationary bearing 121, Figures 2, 25 and 26, rigidly secured to the lower end of a vertical arm 122 which is bolted to the bed 79, Figure 2. When the shaft 120 rotates, it reciprocates the shaft 113 which will cause the shaft 109 to reciprocate, which in turn will rock the crank shaft 97 and cause the loopers to move toward and from the needles.

The numeral 123, Figures 9, 19 and 14 to 17, designates a horizontal rock shaft arranged near and parallel with the crank shaft 97 and the rock shaft 123 is arranged between the blocks 96 and is pivotally mounted thereon, as described in connection with the crank shaft 97. A crank 124 is rigidly mounted upon the rock shaft 123 and is pivotally connected at 125 with a connecting rod 126 which is pivoted at 127 with a crank 128 rigidly secured to the crank shaft 97, Figure 14. It is thus seen that the turning movement of the crank shaft 97 will rock the shaft 123. The shaft 123 has a crank block 129, Figure 19, rigidly secured thereto and this crank block has generally horizontal rods 130 rigidly adjustably secured thereto by set screws 130' and these rods have slots 131 formed therein to receive blades 132 and the blades are clamped in place by set screws 133. These blades are arranged to bear against the loopers adjacent to their bills and the blades are arranged to sever the loops formed upon the looper and to leave one or more loops unsevered, as is the practice in the operation of a conventional tufting machine.

Arranged above the loopers 104 is a guard 134, Figure 7, one end of which is rigidly secured to one block 96, the opposite end is rigidly secured to a vertical block 135, which in turn is rigidly mounted upon the other block 96. This guard has a generally horizontal portion provided with notches 136, Figure 9, for the passage of the needles. This guard is arranged slightly below a bed plate 137 which is rigidly secured to the base 20 and has a large cylindrical opening 138. The fabric extends across the opening 138 and is clamped to the bed plate 137 during the tufting operation and is therefore held in close relation to the horizontal portion of the guard 134.

Rotatably mounted within the arm 22, Figures 2, 20 and 25, is a main horizontal drive shaft 139 receiving rotation from a pulley 140 driven by any suitable means. A bevel-gear 141 is rigidly mounted upon the drive shaft 139 and engages a bevel-gear 142, rigidly mounted upon a stub shaft 143, carried by a fixed bearing 144. This stub shaft has a disc 145 rigidly secured thereto. The disc 145 is provided with a pivot 146 disposed radially outwardly of the center of the disc and this pivot is connected with a connecting rod 147, which extends forwardly and is connected with an upstanding crank 148, rigidly mounted upon a rock shaft 149, Figures 11 and 25. This rock shaft is journaled in fixed bearings 150 carried by the head 23. Rigidly mounted upon the rock shaft 149 are cranks 151, and these cranks operate within vertical elongated slots 152, formed in the head 23 and the forward ends of the cranks 151 are pivotally connected with trunnions 153, Figure 11, rigidly secured to the cylinder 41. It is thus seen that rotation of the drive shaft 145 will operate the cranks 151 through the medium of the connecting rod 147 and associated elements and the cranks 151 will reciprocate the cylinder 41 which in turn will reciprocate the tubular needle bar 62.

Rigidly mounted upon the main drive shaft 139 is a sprocket wheel 154 engaged by a sprocket chain 155, extending downwardly and engaging the sprocket wheel 156, Figures 21 and 25, which is rigidly mounted upon a longitudinal horizontal shaft 157, journaled in fixed bearings 158, 159 and 160, Figure 4. The shaft 157 has a small gear 161 rigidly secured thereto engaging a large gear 162 rigidly mounted upon a second longitudinal horizontal shaft 163 journaled in the bearings 159 and 160. The shaft 163 is rotated at a reduced speed through the gearing 161 and 162. Rigidly mounted upon the shaft 163 is a sprocket wheel 164, engaged by a sprocket chain 165 extending upwardly to engage a sprocket wheel 166 mounted upon a longitudinal horizontal shaft 167 journaled in a sleeve bearing 167', held fixed in clamps 168, Figure 2. The shaft 167 extends through an opening formed in the flange 24 and carries a worm 169 engaging the worm wheel 37, Figures 6 and 25. The shaft 163 is provided at its right end with a sprocket wheel 170 engaging a sprocket chain 171, engaging a sprocket wheel 172 rigidly mounted upon a shaft 173, journaled in a fixed bearing 174 and a fixed bearing 174', Figure 24. This sprocket chain also engages an idler sprocket wheel 175 rotatably mounted upon a bracket 176, Figure 23. The shaft 173, Figure 24, has a worm 177 rigidly secured thereto and this worm engages and drives the worm wheel 85. The two worm wheels 37 and 85, are driven at a reduced speed, at the same speed and in the same direction. Rigidly mounted upon the right end of the shaft 157 is a sprocket wheel 178, engaging the sprocket chain 179, engaging sprocket wheel 180, rigidly mounted upon the shaft 120. The shaft 157 is driven at the same speed as the drive shaft 145, and hence the shaft 113, will reciprocate the loopers so that they properly coact with the needles.

Arranged near and above the base plate 137 is a presser frame or ring 181, Figures 1, 2 and 6, rigidly secured to a vertical presser bar 182 by a screw 183, or the like and also secured thereto by diagonal braces 184. This presser bar is slidably mounted in a vertical guide 185, rigidly secured to the head 23 and the presser bar 182 is moved downwardly by the compressible coil spring 186. The presser bar is raised by a cam 187 pivoted upon a pin 188 rigidly secured to the guide 185. The cam is turned by a lever 189 integral therewith. The cam operates within a slot 190 formed in the presser bar 182 and guide and pin 188 extends through an elongated slot 191 formed in the presser bar 182. It is thus seen that when the cam is in the lowered position, the spring 186 will cause the presser frame to press the fabric against the bed plate 137 and hold the fabric stationary upon the bed plate.

Clamped to the cylinder 73 is a ring 192, Figures 2 and 6, having horizontal arms 193 rigidly secured thereto. Vertical bars 194 are rigidly secured to the arms 193 and carry an upper horizontal arm 195 rigidly secured thereto. The arms 193 are provided with spindles for rotatably supporting spools 196 of yarn 197 which may be of different colors, if desired. Since the machine embodies two needles, two spools of yarn are used. The yarn passes upwardly from the spools and is threaded through openings 198 formed in the arm 195. The yarn then passes downwardly through openings 198' and thread tension devices 199 and thread guides 200 and then extends downwardly through the tubular needle bar 62, and is threaded through the eyes of the needle. The supporting structure including the arms 193 turn with the sleeve 73 but does not reciprocate with the needle bar.

The operation of the machine is as follows:

The ratio of the gear 58 to the stationary sun-gear 59 is one to six and the ratio of the gear 95 to the sun-gear 86 is one to six. The gears 58 and 95 therefore make six complete revolutions when traveling once completely around their sun-gears. The planetary carriers 27, 28, 82 and discs 42 and 43 turn as a unit. The planetary carriers 27, 28 and 82 are shown diagrammatically in Figures 28 and 29. The planetary carriers 28 and 82 turn slowly in the same direction, clockwise, as shown in Figure 29, and at the same speed. The needle planet 69 and the looper planet 89 are shown in Figure 28. The planets 69 and 89 turn counter-clockwise, Figure 29, and turn upon their axes in unison and at the same speed and are shifted bodily through circular orbits at the same speed by the planetary carriers 28 and 82 and in the same direction. This movement causes the loopers to retain proper relation with the needles, since the needles and loopers are shifted in unison throughout th same paths of travel for producing the design. The planetary carriers 27, 28 and 82 have their centers in vertical alignment, and the planets 69 and 89 have their centers in vertical alignment, Figure 28. For the purpose of explaining the operation more clearly, in Figure 32, the planetary carrier 28 has been divided into six equal circumferential portions by lines $a$ and each circumferential portion between each pair of lines $a$ has been divided into four equal portions by lines $b$. The needle planet 69 has its complete revolution indicated by the circle $c$ and this circle is divided into four equal parts by line $d$. When the planetary carrier 28 is moved counter-clockwise, Figure 32, so that the next trailing line $a$ travels from its position to the stationary point $e$, then the planet 69 will have made one complete revolution. At the starting of the tufting operation, the fabric is held stationary and flat upon the base plate by the presser frame 181. At the starting of the operation, the two needles will start to sew at the point $a'$ and when the needle planet 69 has made ¼ of a revolution, in the direction of the arrow, Figure 33, the next trailing line $d$ will register with the stationary point $f$, while the next trailing line $b$ will register with the stationary point $e$. During this operation, the needles will sew a curved line of tufting T from the point $a'$ to the point $b'$. When the planet 69 turns for the next ¼ revolution so that the next trailing line $d$ will register with the stationary line $f$, the next trailing point $b$ of the planetary carrier will register with the stationary point $e$ and the needle will sew a line of tufting from point $b'$ to point $c'$. When the planet 69 is turned for the next ¼ of a revolution, the next trailing point $d$ will register with the stationary line $f$ and the next trailing line $b$ will register with the stationary line $e$ and the needle will sew the line of tufting from the point $c'$ to the point $d'$. When the planet 69 travels for the next ¼ of a revolution, the next trailing point $d$ will register with the stationary line $f$ and the trailing line $a$ will register with the stationary line $e$ and the needles will sew the line of tufting from the point $d'$ to the point $f'$. When the planet 69 turns for the next ¼ of a revolution, the next trailing point $d$ will register with the stationary line $f$ and the next trailing line $b$ will register with the stationary line $e$ and the needle will sew the line of tufting from the point $f'$ to the point $g'$. When the planet 69 is turned for the next ¼ of a revolution, the next trailing point $d$ will register with the stationary line $f$ and the next trailing line $b$ will register with the stationary line $e$ and the needle will sew the line of tufting from the point $g'$ to the point $h'$. When the planet 69 is turned for the next ¼ of a revolution, the next trailing point $d$ will register with the stationary line $f$ and the next trailing line $b$ will register with the stationary line $e$ and the needles will sew the line of tufting from the point $h'$ to the point $i'$. When the planet 69 is turned for the next ¼ of a revolution, the next trailing point $d$ will register with the stationary line $f$ and the next trailing line $a$ will register with the stationary line $e$ and the needles will sew the line of tufting from the point $i'$ to the point $j'$. The complete loops having the shape as shown in Figure 34 are produced. This may be regarded as a complete unit and the units are repeated as the work continues. Two more units will be completed to make the complete design shown in Figure 34, since there are two loops in each unit and there are six loops in all. While the operation of the planet 69 has been thus traced in detail, it will be seen that an identical operation is performed by the planet 89 and the two planets move in unison so that the loopers retain their proper relation with respect to the needles. Since the ratio between the gear and its sun-gear is one to six, six loops are formed arranged as shown. If the ratio is changed to one to four, a pattern will be produced embodying four complete loops and if changed to one to ten, a pattern would be produced containing ten loops. The figure produced simulates a flower embodying loops which are generally radially arranged. The design is the result of the combined movement of the carriers and the planets traveling in orbits bodily with the carriers and at the same time turning upon their axes. The tufting operation performed by each needle and its coacting looper is the same as produced by the conventional tufting machine. When the needle moves downwardly, it carries the yarn through the fabric and when the needle is at or near its lowermost position, the looper enters the loop and the loop remains upon the looper as the needle rises. Two or more unsevered loops are accumulated upon the looper and as the looper moves from the needle, the blade severs the next loop leaving two or more loops unsevered. As shown in Figure 30, the looper is swung back and forth as indicated by the lower arrow but the looper is traveling with the planet toward its forward end or hook 16, as shown in the upper arrow. This causes the loops to move rearwardly upon the looper corresponding to the action of the conventional tufting machine wherein the work is fed toward the closed end of the loop. The reciprocation of the loopers is effected by the reciprocation of the shaft 109, operating within the groove 111 of the disc 112. Disc 112 is reciprocated by the pin 119 through the medium of the link 117. The shaft 109 raises and lowers the block 108, which swings the cranks 101 which are rigidly secured to the shaft 97. The rocking movement of the shaft 97 is imparted to the rock shaft 123 through the medium of the cranks 128 and 124 and link 126. The blades are mounted upon the shaft 123 and since the looper and blade swing about different centers, the blades have a longitudinal movement with respect to the loopers and sever the loops. The needle bar 62 is reciprocated by the swinging movement of the cranks 151 and associated elements which are driven from the drive shaft 139. The planetary carriers are rotated slowly by the worm drive. During the sewing operation, the yarn passes through the tubular needle bar, as is obvious. When the machine has completed the tufted design, the presser frame is raised and the yarn severed and the fabric shifted to position the same for making the next design. The presser frame is again lowered to hold the fabric stationary and the operation is repeated.

The machine may be operated to produce the design without severing the loops. When this is done, the blade is removed from each looper and a looper used having no down tension bill or a very slight down tension bill. The machine is then operated in the reverse direction than that indicated in Figure 29. The planet carriers then turn in an opposite direction to their arrows, see Figure 29. When the needle moves down through the fabric to the lowermost position, the looper enters the loop and holds the loop until the needle has reached the end of its up stroke and after this the looper moves out of the loop and releases the same. The looper will then enter the next formed loop when the needle reaches the lowermost position upon its next down stroke.

It is to be understood that the form of the invention herewith shown and described is to be taken as a preferred embodiment of the same and that various changes in the shape, size and arrangement of parts may be resorted to, without departing from the spirit of the invention or the scope of the subjoined claims.

Having thus described the invention, what is claimed is:

1. In a tufting machine for sewing a design in a fabric base, means for supporting the fabric base, a planetary carrier arranged upon one side of the fabric base supporting means, means to rotate the planetary carrier, a planet mounted upon the planetary carrier for carrying a needle, means to turn the planet upon its axis including a stationary sun-gear and a coacting gear engaging the sun-gear, means to reciprocate the planet axially of the planetary carrier, a second planetary carrier arranged upon the opposite side of the fabric base supporting means, means to rotate the second planetary carrier, a second planet mounted upon the second planetary carrier, means to turn the second planet upon its axis including a stationary sun-gear and a coacting gear engaging the sun-gear, a looper mounted upon the second planet, and means to reciprocate the looper.

2. In a tufting machine for sewing a design in a fabric base, as a sub-combination, means for supporting the fabric base, a support arranged upon one side of the fabric base supporting means, planetary carrier means rotatably mounted upon the support, means to rotate the planetary carrier means, a guide element extending longitudinally of the support, a reciprocatory device mounted upon the guide element and including rotatable head means, means to reciprocate said device, a needle bar slidably mounted upon the planetary carrier means and engaging the head means to turn with relation thereto and to be reciprocated with the head means, said needle bar being spaced radially from the guide element, means to turn the needle bar upon its longitudinal axis, and a planet mounted upon the needle bar for carrying a needle.

3. In a tufting machine for sewing a design in a fabric base, as a sub-combination, means for supporting the fabric base, a support arranged upon one side of the fabric base supporting means, planetary carrier means rotatably mounted upon the support, means to rotate the planetary carrier means, a shaft extending axially of the planetary carrier means and arranged centrally thereof, a reciprocatory device mounted upon the shaft and including rotatable head means arranged in concentric relation to the planetary carrier means, a needle bar slidably mounted upon the planetary carrier means and engaging the head means to turn with relation thereto, said needle bar being spaced radially from said shaft, means to cause the head means to reciprocate the needle bar, means to turn the needle bar upon its longitudinal axis, and a planet mounted upon the needle bar for carrying a needle.

4. In a tufting machine for sewing a design in a fabric base, as a sub-combination, means for supporting the fabric base, a support arranged upon one side of the fabric base supporting means, planetary carrier means rotatably mounted upon the support, means to rotate the planetary carrier means, a guide element extending axially of the planetary carrier means and arranged centrally thereof, head means slidably mounted upon the guide element and arranged concentrically with relation to the planetary carrier means, a sleeve rotatably holding the head means, a crank connected with the sleeve to reciprocate it, means to move the crank, a needle bar slidably mounted upon the planetary carrier means, and engaging the head means, said needle bar being spaced radially from said guide element, means to cause the needle bar to reciprocate with the head means, means to turn the needle bar upon its longitudinal axis, and a planet carried by the needle bar for holding a needle.

5. In a tufting machine for sewing a design in a fabric base, as a sub-combination, means for supporting the fabric base, a support arranged upon one side of the fabric base supporting means, planetary carrier means rotatably mounted upon the support, means to rotate the planetary carrier means, a shaft extending axially of the planetary carrier means and arranged centrally thereof, a needle bar slidably mounted upon the planetary carrier means, said needle bar being spaced radially from said shaft, a rotatable unit slidably receiving the needle bar and including a gear and a head, a rod carried by the head and extending longitudinally of the needle bar, an element slidably engaging the rod and secured to the needle bar to turn it, means to rotate the gear, means mounted upon the shaft to reciprocate the needle bar, and a planet secured to the needle bar for holding a needle.

6. In a tufting machine for sewing a design in a fabric base, as a sub-combination, means for supporting the fabric base, a support arranged upon one side of the fabric base supporting means, planetary carrier means rotatably mounted upon the support and having an axis of rotation, means to rotate the planetary carrier means, a needle bar slidably mounted upon the planetary carrier means and spaced radially from said axis of rotation, means to turn the needle bar upon its longitudinal axis including a gear, a stationary sun-gear mounted upon the support, gearing to drive said gear including a gear to engage the sun-gear, means to reciprocate the needle bar, and a planet secured to the needle bar for holding a needle.

7. In a machine for tufting a design in a fabric base, means for supporting the fabric base, a support arranged upon one side of the fabric base supporting means, a second support arranged upon the opposite side of the fabric base supporting means, planetary carrier means rotatably mounted upon the first support, a planetary carrier rotatably mounted upon the second support, a main drive shaft, a worm drive to rotate the planetary carrier means, a second worm drive to rotate the planetary carrier, means to drive the first and second named worm drives from the main drive shaft, a needle carrying planet, means to mount the needle carrying planet upon the planetary carrier means so that the planet may turn with relation to the planetary carrier means and reciprocate axially of the same, means to turn and reciprocate the planet, a second planet mounted upon the planetary carrier to rotate with relation thereto, means to rotate the second planet, a looper mounted upon the second planet, and means to reciprocate the looper.

8. In a machine for tufting a design in a fabric base, means for supporting the fabric base, a support arranged upon one side of the fabric base supporting means, a planetary carrier mounted upon the support and having an axis of rotation, means to rotate the planetary carrier and having an axis of rotation which is spaced radially from the axis of rotation of the planetary carrier, a planet rotatably mounted upon the planetary carrier, means to rotate the planet, a looper mounted upon the planet and spaced radially from the axis of the rotation of the planet, means to reciprocate the looper including a rod to travel with the planetary carrier, a reciprocatory member arranged in substantially concentric relation to the axis of rotation of the planetary carrier, means effecting a slidable connection between the member and rod, and means to reciprocate the member.

9. In a machine for tufting a design in a fabric base, means for supporting the fabric base, a support arranged upon one side of the fabric base supporting means, a planetary carrier mounted upon the support and having an axis of rotation, means to rotate the planetary carrier, a planet rotatably mounted upon the planetary carrier and having an axis of rotation which is radially spaced from the axis of rotation of the planetary carrier, means to rotate the planet including a tubular structure disposed at the center of the planet, a looper mounted upon the planet, means to reciprocate the looper including a rod operating within the tubular structure, a reciprocatory member having an annular groove and arranged in concentric relation to the axis of rotation of the planetary carrier, an element secured to the rod and engaging within the annular groove, and means to reciprocate the member.

10. In a machine for tufting a design in a fabric base, means for supporting the fabric base, a support arranged upon one side of the fabric base supporting means, planetary carrier means rotatably mounted upon the support and having an axis of rotation, means to rotate the planetary carrier means, a tubular needle bar slidably mounted upon the planetary carrier means and radially spaced from the axis of rotation of the planetary carrier means, a planet mounted upon the needle bar for holding a needle, means to reciprocate the tubular needle bar, means to rotate the tubular needle bar upon its longitudinal axis, and means for supporting yarn which is passed through the tubular needle bar, the supporting means being connected with the rotating means to rotate therewith.

11. In a machine for tufting a design in a fabric base, means for supporting the fabric base, a support arranged upon one side of the fabric base supporting means, planetary carrier means rotatably mounted upon the support and having an axis of rotation, means to rotate the planetary carrier means, a tubular needle bar slidably mounted upon the planetary carrier means and radially spaced from the axis of rotation of the planetary carrier means, a tubular structure slidably receiving the upper portion of the tubular needle bar and including a gear and a supporting member rotating together, means to rotate the gear, means to reciprocate the tubular needle bar, means connecting the supporting member and tubular needle for turning the tubular needle upon its longitudinal axis, yarn carrying means mounted upon the supporting member to rotate therewith, the yarn passing through the tubular needle bar, and a planet secured to the tubular needle bar for carrying a needle.

12. In a tufting machine for sewing a design in a fabric base, means for supporting the fabric base, planetary carrier means arranged upon one side of the fabric base supporting means and having a turning axis which is generally perpendicular to the fabric base supporting means, a planet mounted upon the planetary carrier means and having a turning axis which is generally perpendicular to the fabric base supporting means and spaced radially from the turning axis of the planetary carrier means, means to turn the planetary carrier means upon its axis, means to turn the planet upon its axis, a needle carried by the planet and radially spaced from the turning axis of the planet, a second planetary carrier arranged upon the opposite side of the fabric base supporting means and having a turning axis which is generally perpendicular to the fabric base supporting means, a second planet mounted upon the second planetary carrier and having a turning axis which is spaced radially from the turning axis of the second planetary carrier and arranged generally perpendicular to the fabric base supporting means, means to turn the second planetary carrier upon its axis, means to turn the second planet upon its axis, a looper mounted upon the second planet and spaced radially from the turning axis of the second planet, means to reciprocate the first named planet in a direction toward and from the fabric base supporting means, and means to reciprocate the looper, the looper coacting with the needle.

13. In a tufting machine for sewing a design in a fabric base, means for supporting the fabric base, a planetary carrier arranged upon one side of the fabric base supporting means and having a turning axis which is generally perpendicular to the fabric base supporting means, a planet mounted upon the planetary carrier and having a turning axis which is generally perpendicular to the fabric base supporting means and spaced radially from the turning axis of the planetary carrier, means to turn the planetary carrier upon its axis, means to turn the planet upon its axis, a needle carried by the planet and radially spaced from the turning axis of the planet, a second planetary carrier arranged upon the opposite side of the fabric base supporting means and having a turning axis which is generally perpendicular to the fabric base supporting means, a second planet mounted upon the second planetary carrier and having a turning axis which is spaced radially from the turning axis of the second planetary carrier and arranged generally perpendicular to the fabric base supporting means, means to turn the second planetary carrier upon its axis, means to turn the second planet upon its axis, a looper mounted upon the second planet and spaced radially from the turning axis of the second planet, means to reciprocate the first named planet in a direction axially of the first named planetary carrier, means to reciprocate the looper, and means to sever the loops upon the looper, the looper coacting with the needle.

14. In a tufting machine for sewing a design in a fabric base, means for supporting the fabric base, a planetary carrier arranged upon one side of the fabric base supporting means and having a turning axis which is generally perpendicular to the fabric base supporting means, a planet mounted upon the planetary carrier and having a turning axis which is generally perpendicular to the fabric base supporting means and spaced radially from the turning axis of the planetary carrier, a needle carried by the planet and radially spaced from the turning axis of the planet, a second planetary carrier arranged upon the opposite side of the fabric base supporting means and having a turning axis which is generally perpendicular to the fabric base supporting means, a second planet mounted upon the second planetary carrier and having a turning axis which is spaced radially from the turning axis of the second planetary carrier and arranged generally perpendicular to the fabric base supporting means, a looper mounted upon the second planet and spaced radially from the turning axis of the second planet, means to reciprocate the first named planet in a direction toward and from the fabric base supportting means, means to rotate the first and second named planetary carriers in the same direction and at substantially the same speed, means to rotate the first and second named planets in the same direction and at substantially the same speed, and means to reciprocate the looper.

15. In a tufting machine for sewing a design in a fabric base, as a sub-combination, means for supporting the fabric base, a support arranged upon one side of the fabric base supporting means, planetary carrier means mounted upon the support, said planetary carrier means having an axis of rotation which is generally perpendicular to the fabric base supporting means, means to rotate the planetary carrier means, a needle bar mounted upon the planetary carrier means and spaced radially from the axis of rotation of the planetary carrier means and adapted to turn and reciprocate with relation to the planetary carrier means, said needle bar extending longitudinally of the axis of rotation of the planetary carrier means, a planet carried by the needle bar and extending radially beyond the needle bar and provided with needle holding means which is radially spaced from the needle bar, means arranged near the planetary carrier means and engaging the needle bar to reciprocate the same, and means to turn the needle bar upon its longitudinal axis.

16. In a tufting machine for sewing a design in a fabric base, means for supporting the fabric base, a support arranged upon one side of the fabric base supporting means, planetary carrier means mounted upon the support and having a turning axis, means to turn the planetary carrier means about said turning axis, a needle bar mounted upon the planetary carrier means and having a turning axis spaced radially outwardly from the turning axis of the planetary means, said needle bar being mounted to turn upon its axis and reciprocate with relation to the planetary carrier means, a shaft mounted upon the planetary carrier means and extending longitudinally of the needle bar, a device mounted to reciprocate upon the shaft and connected with the needle bar to reciprocate same, means to reciprocate the device, a planet mounted upon the needle bar for carrying a needle, and means to turn the needle bar upon its turning axis.

17. In a machine for tufting a design in a fabric base, a bed for receiving the fabric base thereon, a needle carrying planet arranged upon one side of the fabric base and bed to be moved in an orbit about an axis, the planet having a turning axis spaced radially outwardly from the first named axis, means to bodily move the planet in the orbit about the first named axis, means to turn the planet upon its axis in addition to its movement in said orbit, means to reciprocate the planet toward and from the base and bed, a second planet arranged upon the opposite side of the fabric base and bed to be moved in an orbit about an axis and having a turning axis spaced radially outwardly of the last named axis, means to move the second planet bodily in the second orbit and about the axis of the second orbit, means to turn the second planet upon its turning axis in addition to the movement of the second planet in the second orbit, a looper mounted upon the second planet, and means to reciprocate the looper.

18. In a tufting machine for sewing a design in a fabric base, means for supporting the fabric base, a planet arranged upon one side of the fabric base supporting means and having a turning axis arranged generally perpendicular to the fabric base supporting means, a needle carried by the planet and radially spaced from the turning axis of the planet, rotary means carrying the planet and having a turning axis which is generally perpendicular to the fabric base supporting means, the turning axis of the planet being spaced radially outwardly from the turning axis of the rotary means, the rotary means serving to move the planet bodily in an orbit about the turning axis of the rotary means, means to turn the planet upon the axis of the planet, a second planet disposed upon the opposite side of the fabric base supporting means and having a turning axis which is disposed generally perpendicular to the fabric base supporting means, rotary means carrying the second planet and having a turning axis which is generally perpendicular to the fabric base supporting means, the turning axis of the second planet being spaced radially outwardly of the turning axis of the second rotary means, the second rotary means serving to move the second planet in an orbit about the turning axis of the second rotary means, means to turn the second planet upon its turning axis, a looper mounting upon the second planet and spaced radially from the turning axis of the second planet, means connected with the first named planet to reciprocate such planet in a direction toward and from the fabric base supporting means, means connected with the looper to reciprocate the looper, the looper coacting with the needle, and means to drive the first named rotary means and the second named rotary means.

DELLRAY MONTGOMERY,
*Administratrix of the estate of Julius Montgomery, deceased.*

References Cited in the file of this patent

UNITED STATES PATENTS

| Number | Name | Date |
|---|---|---|
| 349,090 | Happe | Sept. 14, 1886 |
| 1,905,114 | Lauterbur et al. | Apr. 25, 1933 |
| 2,540,901 | Montgomery | Feb. 6, 1951 |
| 2,573,043 | Montgomery | Oct. 30, 1951 |